US008885249B2

(12) United States Patent
Fatome et al.

(10) Patent No.: US 8,885,249 B2
(45) Date of Patent: Nov. 11, 2014

(54) SYSTEM FOR MONITORING ALL-OPTICAL POLARIZATION HAVING A CONTRA-PROPAGATING PUMP BEAM

(75) Inventors: Julien Fatome, Dijon (FR); Stéphane Pitois, Corcelles-les-Citeaux (FR)

(73) Assignee: Centre National de la Recherche Scientifique—CNRS, Paris (FR)

( * ) Notice: Subject to any disclaimer, the term of this patent is extended or adjusted under 35 U.S.C. 154(b) by 238 days.

(21) Appl. No.: 13/496,130

(22) PCT Filed: Sep. 2, 2010

(86) PCT No.: PCT/FR2010/051826
§ 371 (c)(1),
(2), (4) Date: May 17, 2012

(87) PCT Pub. No.: WO2011/033203
PCT Pub. Date: Mar. 24, 2011

(65) Prior Publication Data
US 2012/0230355 A1  Sep. 13, 2012

(30) Foreign Application Priority Data
Sep. 17, 2009  (FR) ...................................... 09 04451

(51) Int. Cl.
H01S 3/10 (2006.01)
(52) U.S. Cl.
USPC ...................................... 359/337; 359/337.5
(58) Field of Classification Search
USPC .............................................. 359/337, 337.5
See application file for complete search history.

(56) References Cited

U.S. PATENT DOCUMENTS

| | | | | |
|---|---|---|---|---|
| 5,400,164 A | * | 3/1995 | Kurtzke et al. | 398/150 |
| 5,754,334 A | * | 5/1998 | Artiglia et al. | 359/332 |
| 2003/0011875 A1 | * | 1/2003 | Gray et al. | 359/334 |
| 2003/0090781 A1 | * | 5/2003 | Onishi et al. | 359/334 |
| 2003/0152346 A1 | * | 8/2003 | Aso et al. | 385/123 |
| 2009/0213877 A1 | * | 8/2009 | Tunnermann et al. | 372/6 |

OTHER PUBLICATIONS

S. Pitois, et al., "New Concepts Based on Nonlinear Polarization Effects and Raman Amplification in Optical Fibers", IEEE/LEOS Winter Topicals Meeting Series, 2009, IEEE, Piscataway, NJ, Jan. 12, 2009, pp. 223-224.

J. Fatome, "Experimental Evidence of Brillouin-Induced Polarization Wheeling in Highly Birefringent Optical Fibers", Optics Express Jul. 20, 2009 Optical Society of America USA, vol. 17, No. 15, Jul. 20, 2009, pp. 12612-12618.

(Continued)

*Primary Examiner* — Mark Hellner
(74) *Attorney, Agent, or Firm* — Arent Fox LLP

(57) ABSTRACT

The present invention relates to a system (1) for stabilizing the polarization of an input light beam (2'), including a means (3) for optically guiding the input light beam (2'). In said system, the optical guide means (3) has Kerr nonlinearity and low polarization mode dispersion. Additionally, said system (1) also includes a means (4) for generating a pump light beam (4'), the polarization of which is fixed over time and the spectrum of which is suited for the Brillouin scattering threshold in the optical guide means (3). Said generating means (4) is arranged such that the input light beam (2') and pump light beam (4') are contra-propagating in the optical guiding means (3).

19 Claims, 2 Drawing Sheets

(56) References Cited

OTHER PUBLICATIONS

L. Thevenaz, et al., "All-Optical Polarization Control Through Brillouin Amplification", Optical Fiber Communication/National Fiber Optic Engineers Conference, 2008, OFC/NFOEC 2008, Conference on, IEEE, Piscataway, NJ, Feb. 24, 2008, pp. 1-3.

S. Pitois, et al., "Polarization Attraction Using Counter-Propagating Waves in Optical Fiber at Telecommunication Wavelengths", Optics Express, OSA (Optical Society of America), Washington DC, vol. 16, No. 9, Apr. 25, 2008, pp. 6646-6651.

* cited by examiner

SYSTEM FOR MONITORING ALL-OPTICAL POLARIZATION HAVING A CONTRA-PROPAGATING PUMP BEAM

CROSS-REFERENCE TO RELATED APPLICATION

This Application is a National Stage Entry of International Application No. PCT/FR2010/051826, having an international filing date of Sep. 2, 2010; which claims priority to French Application No. 09/04451, having a filing date of Sep. 17, 2009; the disclosure of each of which is hereby incorporated in its entirety by reference.

TECHNICAL FIELD

The present invention relates to the field of monitoring and stabilizing the polarization of a light signal, in optical-fiber-based systems (optical fiber telecommunications systems, optical fiber sensors, metrology, all-optical regenerators, etc.).

It more particularly relates to a system for stabilizing the polarization of an input light beam, including means for optically guiding the input light beam.

PRIOR ART

In certain fields such as telecommunications, polarization constitutes a problematic parameter with regard to the considered performance. In fact, it is currently noticed that there is an inability to provide the polarization state of a light beam after it has propagated along several kilometers of optical fiber. This fluctuation of polarization at the output of the fiber originates from the light birefringence of common optical fibers, which suffices to randomly modify the polarization of light propagating thereto. Monitoring the polarization of a signal injected into an optical fiber thus constitutes a general technical issue which would make it possible to increase the performance of many optical systems.

In this field, the prior art includes different solutions for monitoring and stabilizing the polarization state of a signal output from the optical fiber.

In a first solution, a dissipative device, such as for example a Glan polarizer, is used. This type of device makes it possible to have in output of fiber a constant polarization beam.

Nevertheless, the drawback of such a device is that the intensity of the output beam directly depends on the polarization state of the input signal. Hence, the polarization fluctuations of the input signal lead to intensity fluctuations of the output signal; this is not satisfactory for most of the considered applications.

In a second solution, an electronic retro-monitoring device, such as described in patent document U.S. Pat. No. 7,307,722 B2, is used. Such a device comprises an optical monitoring member able to transform the polarization state of an input signal into another polarization state, without loss. An electronic member arranged subsequently makes it possible to measure and analyze this new polarization state. Based on the analysis result, the electronic measuring and analyzing member transmits instructions to the optical monitoring member in view to stabilize the polarization of the output signal on a predetermined state.

However, the drawback of this device is that it implements an electronic component in association with the optical one. Due to the high response time of the electronic member, this device does not make it possible to monitor nor stabilize input signals, the polarization of which varies at a speed higher than a certain threshold determined by this electronic response time.

Another solution, described in document [FATOME J. ET AL, "Experimental evidence of Brillouin-induced polarization wheeling in highly birefringent optical fibers", OPTICS EXPRESS 20090720 OPTICAL SOCIETY OF AMERICA USA, vol. 17, No. 15, 20 Jul. 2009, pages [12612-12618], makes use of the Brillouin retro-scattering within a highly birefringent optical fiber in order to saturate and equalize the refractive power on each of the two axes of the fiber. This device thus, makes it possible to attract any polarization state from the input beam towards a polarization state randomly located on the equator of the Poincare sphere. This system being based on the Brillouin retro-scattering, it is essential that the input beam spectrum is as narrow as possible. This restriction limits in practice the use of this device to continuous or quasi-continuous waves and in reality excludes telecommunications pulse train applications. Moreover, the position of the output polarization on the equator of the Poincare sphere, and which is linked to the phase difference between the two components of linear polarization (the two axes of the fiber), remains a free parameter of the system which randomly varies over time. Finally, this device is highly dissipative and only a low fraction (some percents) of refractive power of the input beam emerges from the system.

Thus, no solution from the prior art makes it possible to have a system for stabilizing the all-optical polarization which may perfectly stabilize a polarization state, while not being subjected to any loss depending on the input polarization and being liable to operate with low response times (typically lower than ten microseconds).

OBJECT OF THE INVENTION

The purpose of the present invention is to remedy to this technical issue, by making it possible to stabilize a polarization state of a light wave in an all-optical manner, particularly without an electronic retro-monitoring member. For this reason, it is based on the non-linear interaction of the two contra-propagative waves in a non-linear medium.

In this respect, the purpose of the present invention relates to a system for stabilizing the polarization of an input light beam, including means for optically guiding the input light beam. In this system, the optical guide means exhibit a Kerr type non-linearity and low polarization-mode dispersion. Moreover, this system also includes means for generating a pump light beam, the polarization of which is fixed over time and the spectrum of which is suited to minimize the Brillouin scattering in the optical guide means. These generation means are arranged such that the input and pump light beams are contra-propagating beams within the optical guide means.

This stabilization system, advantageously combining a non-linear waveguide, contra-propagating input and pump beams, as well as a judicious adjustment of the spectrum of the pump beam, makes it possible to attract the polarization state at the output of the waveguide towards a well determined polarization state, set only by the residual birefringence of the guide and the polarization state of the pump. These two parameters not varying over time, the polarization state at the output of the fiber is thus perfectly stabilized. Parallely, this stabilization system leading to an entropy exchange between the pump and signal beams, the polarization fluctuations are transferred from the input signal on the pump beam and inversely. Consequently, the invention may also be used to scramble the polarization of a light beam or impose on it a particular sequence of polarization states.

Moreover, the polarization stabilization is carried out in an all-optical manner, without any electronic retro-monitoring device, thus offering the possibility of obtaining response times lower than ten microseconds. Finally, this stabilization system does not introduce any losses dependent on the polarization of the input signal.

The object of this invention testifies to an innovating approach in terms of interaction of two contra-propagating waves. In fact, if it may be known to use a perfectly isotropic optical fiber as polarization attractor, by means of two contra-propagative waves, such an isotropic fiber cannot reasonably exceed a length higher than a few meters and be maintained perfectly straight without any torsion. Hence, due to low fiber lengths, the power required to observe the polarization attraction necessarily exceeds around tens or hundreds of Watts, which is incompatible with telecommunications applications where the power does not exceed one Watt. Moreover, pump and signal sources must necessarily be nanosecond pulsed sources, thus, limiting the interest in terms of considered applications. Finally, with an isotropic fiber, the pump wave is required to have a perfectly circular polarization so that the polarization attraction of the input beam occurs towards a unique state.

However, the present invention makes it possible to use great-length fibers, although, such fibers must be wound around themselves within a coil and hence, cannot be isotropic. The approach of the solution being the object of the present invention consists for this reason to consider that the fiber is piecewise isotropic and that the observed stabilization effect resides in the succession of a large number of polarization attractors distributed all along the fiber. Moreover, in the present invention, the polarization state of the pump beam does not have to be circular, and, consequently, the input signal may be attracted towards any polarization state imposed by that of the pump.

The Brillouin scattering threshold is a parameter inherent to the optical guide means of the system, which has for effect to limit the effective power which can propagate within this guide means. It is possible that the pump light beam directly has a spectrum adapted to the minimization of the Brillouin scattering, i.e., a spectrum only engendering a low Brillouin retro-scattering ratio for the pump power used.

However, it is highly possible that this is not the case. Hence, in order to correctly adjust this spectrum, the generation means are associated with means for adapting the spectrum of the pump light beam aiming to minimize the Brillouin scattering within the optical guide means.

More precisely, this adaptation of the pump light beam spectrum consists in adjusting the width of this spectrum such as to eliminate the Brillouin retro-scattering phenomenon in the optical guide means.

According to a first particular embodiment, the input and pump light beams have spectrums centered on substantially equal wavelengths.

According to a second particular embodiment, the input and pump light beams have spectrums centered on different wavelengths. By thus shifting the wavelength of the pump beam to low frequencies, it is made possible to combine the stabilization of the polarization and the amplification of the beam by stimulated Raman effect.

Preferably, the input and pump light beams have substantially equal mean light power. Thus, ensuring optimal efficiency of the system.

In each case, the beams may be constituted of continuous waves, possibly incoherent, or coded or non coded pulse trains.

Advantageously, the system comprises means for adapting the spectrum of the input light beam to minimize the Brillouin scattering within the optical guide means. These means are identical to those that adapt the pump light beam, which make it possible to optimally adapt the spectrum of the input light beam to minimize the Brillouin scattering within the optical guide means and thus, to eliminate the Brillouin retro-scattering phenomenon.

According to a particular variant of embodiment of the invention, the optical guide means comprise at least an optical fiber.

In the case of several optical fibers, the optical guide means preferably comprise at least two optical fibers having different characteristics. These fibers, correctly arranged (for example by welding together) and with different properties (core, doping parameters, etc.), make it possible to induce Brillouin scatterings at different wavelengths. Consequently, as the contributions of each fiber to total Brillouin scattering are not additive, the effective Brillouin gain band is hence widened and the Brillouin threshold reduced. This embodiment thus, makes it possible to increase the pump power or to reduce the spectral width of the pump.

The use of a set of optical fibers welded together at their ends may also serve to manage the chromatic dispersion of the guide means in order to achieve a polarization attractor adapted to high speeds. In fact, a total chromatic dispersion of the guide means close to zero makes it possible to avoid temporally widening the light pulses.

In order to achieve an entirely-fibred stabilization system, it may be provided that the input light beam be injected in an optical guide means, this additional guide means being associated with the means for generating the pump light beam via a set of optical guide means. It will be understood here that this set of guide means comprises the optical guide means with Kerr nonlinear properties and low polarization-mode dispersion.

According to different variants of embodiment of the means for generating the pump light beam, these may include:
  an arrangement of amplifiers, optical band-pass filters and polarizers,
  a laser source, or
  means for recovering a portion of the input light beam and means for polarizing this recovered beam.

According to a particular embodiment, the system comprises means for discharging the pump light beam after passing through the optical guide means.

In this last case, it may be provided that:
  if the input and pump light beams have spectrums centered on substantially equal wavelengths, the discharge means comprise a circulator, or
  input and pump light beams have spectrums centered on different wavelengths, the discharge means comprise a multi-wavelength coupler.

According to another particular embodiment, the system comprises means for outputting the input light beam after passing through the optical guide means.

In this last case, it may be provided that:
  if the input and pump light beams have spectrums centered on substantially equal wavelengths, the output means comprise a circulator, or
  if input and pump light beams have spectrums centered on different wavelengths, the output means comprise a multi-wavelength coupler.

BRIEF DESCRIPTION OF THE DRAWINGS

The invention will be better understood upon reading the detailed description of a non limitative embodiment, accompanied with figures, respectively representing.

For more clarity, the identical or similar members are identified by identical reference signs on all the figs.

BRIEF SUMMARY OF PARTICULAR EMBODIMENTS

Figure 1:
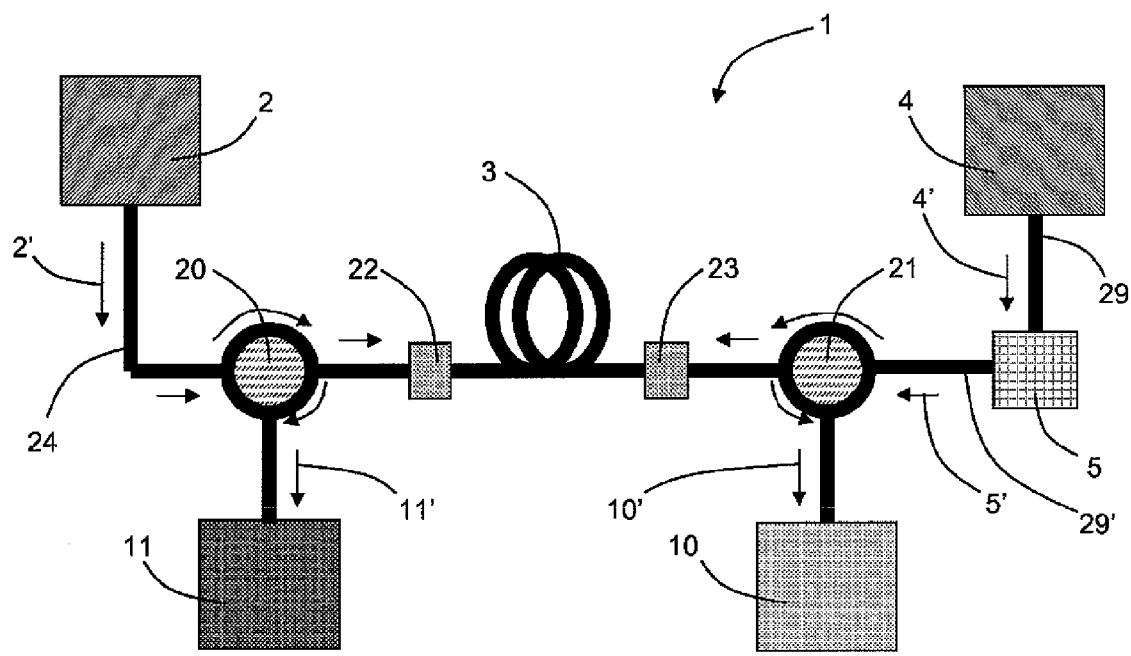
FIG. 1, a diagram of a system for stabilizing the polarization according to a first embodiment of the invention, FIG. 2, a diagram of an alternative embodiment of means for generating the pump light beam, FIG. 3, a diagram of a system for stabilizing the polarization according to a second embodiment of the invention, and FIG. 4, a diagram of a system for stabilizing the polarization according to a third embodiment of the invention.

With reference to FIG. 1, a system for stabilizing the polarization of an input light beam, according to a first embodiment of the invention, comprises:

optical guide means 3, 24 and 29, means 4 for generating a pump light beam 4', means 11 and 20 for discharging the pump beam 4' after passing through the guide means 3, means 10 and 21 for outputting the input beam 2' after passing through the guide means 3, means 5 for adapting the spectrum of the pump beam 4', and connectors 22 and 23.

The purpose of this system 1 is to stabilize and monitor the polarization of the input signal 2'. This signal may come from a signal generator 2, for example a laser diode emitting a continuous light beam. The input signal may be a possibly incoherent continuous wave, or a pulse train, for example a PRBS type coded Telecom pulse train (pseudo random bit sequence). The rate and modulation format of this signal may be indifferent.

The guide means 3 may be a NZ-DSF type commercial fiber, which has a group velocity dispersion of 1.8 picoseconds per nanometer per kilometer (ps/nm/km) and polarization-mode dispersion (PMD) of 0.03 picoseconds per root kilometer (ps·km$^{-1/2}$). Its effective area is close to 50 micrometers squared (μm$^2$) and its length may be of the order of 20 kilometers.

This optical fiber necessarily has Kerr nonlinearity and low polarization mode dispersion (PMD). This low dispersion value may be taken as a value substantially ranging between 0.001 and 0.07 picoseconds per root kilometer (ps·km$^{-1/2}$). This value makes the phase matching condition required for energy exchange between the waves possible locally. In fact, the polarization attraction is linked to a four-wave mixing process (two right and left circular polarized photons for the pump wave and as many for the input wave). The fact that the pump polarization varies continuously all along its propagation in the fiber does not hinder the (attraction) stabilization of the signal polarization. It is an averaging process over the length of the fiber. The fiber dispersion has no major direct influence on the effectiveness of the polarization attraction process. However, when the signal is a picoseconds pulse train, a low cumulated dispersion makes it possible to prevent significant pulse widening.

The generation means 4 makes it possible to generate a pump light beam 4'. It must also be such that the pump wave 4' has a fixed polarization over time. This source may be for example a fiber laser, directly connected to the optical fiber 29, itself connected to the adaptation means 5.

This adaptation means 5 is only useful when the spectrum of the pump beam at the output of the means 4 is not already adapted to minimize the Brillouin scattering inherent to the optical fiber 3. If the adaptation is not carried out, this means 5 correctly adjusts the spectrum width in order to satisfy this condition. This adaptation thus, makes it possible to avoid retro-scattering phenomena within the fiber 3, which would lead to a return of a portion of the pump beam 4' and hence a contra-propagating pump beam 4' weakened within the fiber 3 and finally a less good monitoring of the polarization of the input beam 2' under the effect of the pump beam 4'.

If the pump beam 4' spectrum needs to be narrowed, this means 5 may be constituted of a band-pass optical filter. If on the contrary the spectrum of this beam 4' needs to be widened, this means 5 may be constituted of a phase modulator and/or a pulse compressor.

Typically, a width of 10 Gigahertz is sufficient to be able to inject a pump wave of a mean power of a Watt in 20 kilometers of standard optical fiber. Thus, it is ensured that the pump wave has a spectral width sufficiently great to be placed above the Brillouin scattering threshold.

In this embodiment, the spectrums of input 2' and pump 4' beams are centered on substantially equal wavelengths.

For the input 2' and pump 4' beams to be contra-propagating within the fiber 3, these two beams are injected on either side of this fiber, with opposite directions.

More precisely, the input wave 2' is injected into an optical fiber 24, in order to be guided right into a circulator 20, the purpose of which being to discharge the pump beam 4', after passing through the fiber 3, right into the discharge member 11. This circulator 20 is connected to the optical fiber 3 via the connector 22.

On the other side of the system, the pump beam 4', generated by the source 4, is directed towards the adaptation means 5 via the fiber 29 where its spectrum is narrowed or widened depending on the value of the Brillouin scattering threshold inherent to fiber 3. The beam is then directed towards a circulator 21 via the fiber 29'. The purpose of this new circulator 21 is to make it possible for the input beam, after passing through the fiber 3, to exit in the direction of the output member 10 in view to form the output signal whereof the polarization has been monitored with respect to the input signal 2'. It is connected to the optical fiber 3 via the connector 23.

Hence, the two—input and pump—signals can propagate within the fiber 3 in opposite directions. The input signal exits from the fiber 3 towards the connector 23 to be directed towards the exit 10. The pump signal itself exits from the fiber 3 towards the connector 22 to be directed towards the discharge means 11.

For the efficiency of this system to be optimal, the input wave 2' and the pump wave 4' have comparable mean power.

The circulators 20 and 21 may also be achieved for example with a coupler and an isolator or in the open air with a beam splitter.

Figure 2:
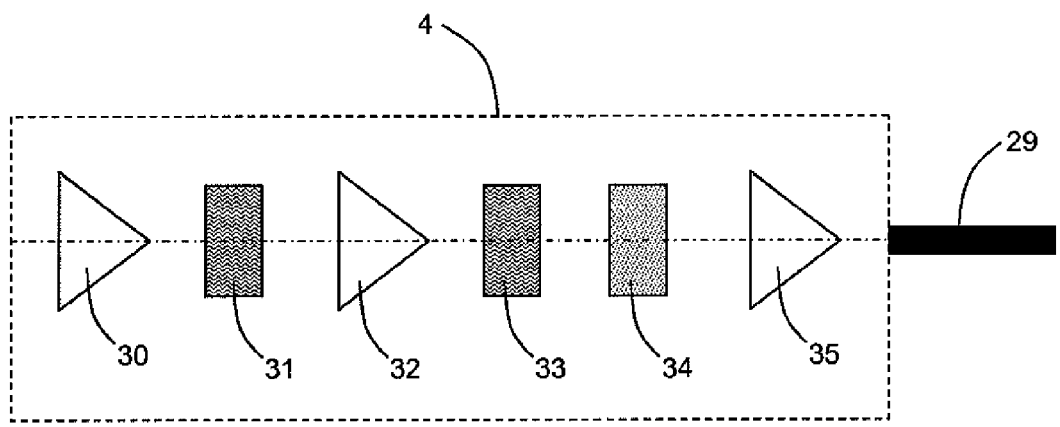

FIG. 2 represents an alternative embodiment of the generation means 4. In this alternative, this source is achieved based on amplifiers with Erbium doped fiber (EDFA) and band-pass optical filters and a polarizer.

To this end, a first amplifier 30 is used "in no-load operation", i.e., without any input signal. This operating regime makes it possible to obtain a strongly incoherent continuous laser source having a spectral width of around 3.5 Terahertz and a mean power of 50 milliwatts. A first band-pass optical filter 31 makes it possible to reduce the spectral width to a value of around 60 Gigahertz.

A second amplifier 32 followed by another band-pass optical filter 33 makes it possible to obtain a weakly coherent laser wave, non polarized, centered on 1545 nanometers, having a spectral width near 30 Giga Hertz and a mean power of the order of 45 milliwatts.

A polarizer 34 is inserted after the filter in order to polarize this pump wave.

Finally, a last amplifier 35 makes it possible to attain, if necessary, means powers of a few hundred milliwatts.

This source 4, such as described in this alternative, may nevertheless be simplified (less stages) if required.

Figure 3:
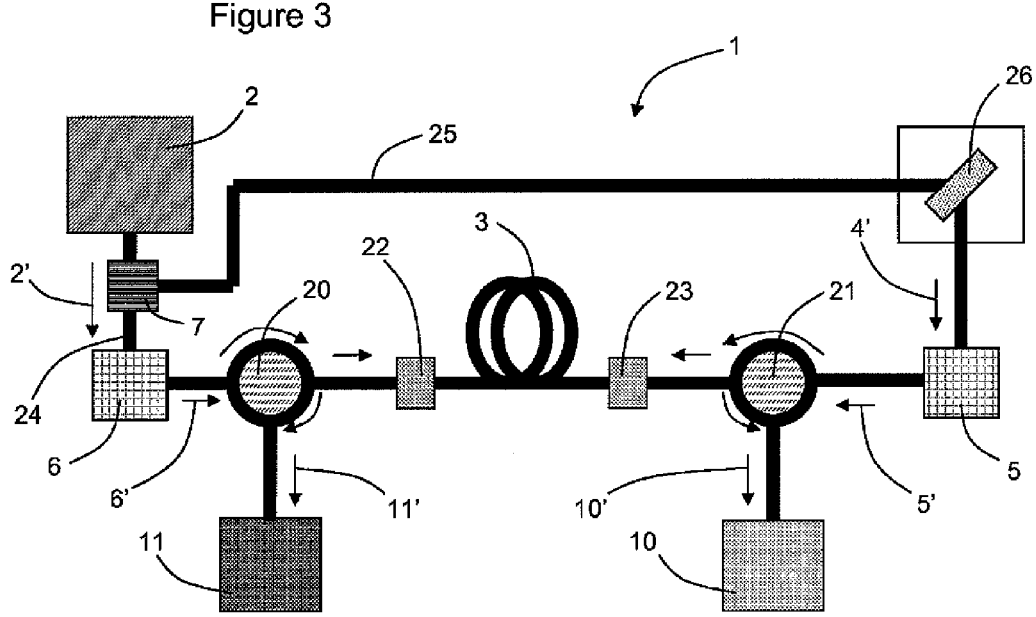

Now a system for stabilizing the polarization will be described according to a second embodiment of the invention, with reference to FIG. 3.

In this embodiment, the spectrums of the input 2' and pump 4' beams are always centered on substantially equal wavelengths. Thus, it is always possible to use the circulators 20 and 21.

This system comprises, in addition to the one according to the first aforementioned embodiment, means 6 for adapting the spectrum of the input light beam 2' to minimize the Brillouin scattering in the optical fiber 3. This means 6 makes it possible to prevent a return of a portion of the signal by Brillouin retro-scattering, thus, making a better contra-propagation of the input beam 2' within the fiber 3 possible and hence, a better monitoring of the polarization of the input beam 2' under the effect of the pump beam 4'.

Moreover, this system also comprises means for recovering a portion of the input light beam 2' and means for recovering this recovered beam. The recovering means may be for example constituted of a splitter 7 not entirely transparent arranged at 45° and an optical fiber 25. In another embodiment, the members 7, 24 and 25 may be replaced by a dual-core optical fiber (as a coupler 50-50), one directed towards the adaptation means 6, the other towards the polarization means. The polarization means may be constituted of a polarizer 26.

This arrangement thus makes it possible to avoid using a source generating the pump beam. the latter being generated based on the input beam and possibly amplified thereafter. The generation means 4 thus comprises, in this embodiment, the means 7, 25 and 26.

Figure 4:
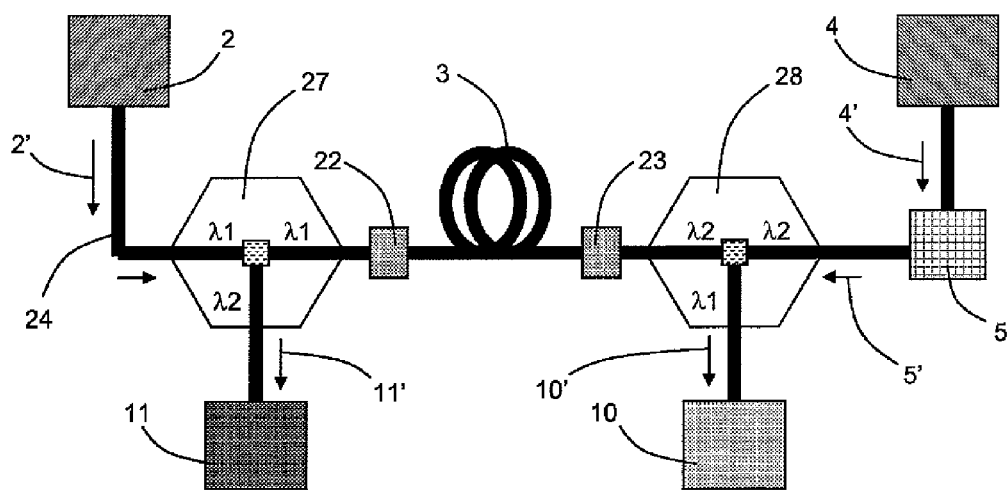

Finally, a system for stabilizing the polarization according to a third embodiment of the invention is described, with reference to FIG. 4.

In this embodiment, the spectrums of the input 2' and pump 4' beams are always centered on different wavelengths, thus, making it possible to combine the stabilization of the polarization and the amplification of the output beam by stimulated Raman effect.

Thus, it is no longer possible to use the circulators 20 and 21, which are replaced by multi wavelength couplers 27 and 28, whereas the other members of the system remain identical with respect to those of the system according to the second aforementioned embodiment.

More particularly, the input wave being at the wavelength $\lambda 1$ and the pump wave at the wavelength $\lambda 2$, the coupler 27 makes it possible to direct towards the discharge means 11 the signal at wavelength $\lambda 2$ (i.e. the pump signal after passing through the non-linear optical fiber 3) and the coupler 28 makes it possible to direct towards the outlet 10 the signal at wavelength $\lambda 1$ (i.e. the input signal after passing through the non-linear optical fiber 3).

The present invention makes it possible to consider increasing the performance of the optical fiber telecommunications systems by relieving constraints with respect to polarization. Thus, it paves the way for new manners of compensating for the polarization-mode dispersion induced by the residual birefringence of the optical fibers (limitative effect for the current high-speed transmissions) or even by improving the systems based on a coherent detection. More generally, the invention makes it possible to consider accelerating the realization of more transparent networks (all-optical) by migration of telecommunications networks towards integrated optical circuit technologies, today highly dependent on the input signal polarization.

The aforementioned embodiments of the present invention are given by way of examples and are in no way limitative. It is obvious that the skilled person is able to achieve different alternatives of the invention without departing from the scope of the invention.

Particularly, the aforementioned optical fiber 3 may be cut into a set of optical fibers welded together at their respective ends, and whereof the physical characteristics (core parameters, doping, etc) are different, thus making it possible to limit the Brillouin retro-scattering phenomena by widening the effective Brillouin gain band and hence, increasing the threshold level. In the same respect, one or two mechanical or thermal constraints may be applied along the optical fiber 3 in order to widen the Brillouin gain band and increase its threshold level.

The use of a set of optical fibers welded together at their ends may also serve to manage the chromatic dispersion of the guide means in order to achieve a polarization attractor adapted to high speeds. In fact, a total chromatic dispersion of the guide means close to zero would make it possible to prevent temporally widening the picoseconds light pulses.

The invention claimed is:

1. A system (1) for stabilizing the polarization of an input light beam (2'), including means (3) for optically guiding the input light beam (2'), characterized in that said optical guide means (3) exhibit a Kerr type non-linearity and a low polarization-mode dispersion having a value ranging between 0.001 and 0.07 picoseconds per root kilometer, and in that the system (1) also comprises means (4) for generating a pump light beam (4') the polarization of which is fixed over time and the spectrum of which is adapted to minimize the Brillouin scattering within said optical guide means (3), said generation means (4) being arranged such that the input (2') and pump (4') light beams are contra-propagating beams within the optical guide means (3).

2. The system (1) according to claim 1, wherein the generation means (4) are associated with means (5) for adapting the spectrum of the pump light beam (4') at the Brillouin scattering threshold within the optical guide means (3).

3. The system (1) according to claim 2, wherein adapting the spectrum of the pump light beam (4') consists in adjusting the width of said spectrum such as to eliminate the Brillouin scattering phenomenon within the optical guide means (3).

4. The system (1) according to claim 1, wherein the input (2') and pump (4') light beams have spectrums centered on substantially equal wavelengths.

5. The system (1) according to claim 1, wherein the input (2') and pump (4') light beams have spectrums centered on different wavelengths.

6. The system (1) according to claim 1, wherein input (2') and pump (4') light beams have substantially equal mean light power.

7. The system (1) according to claim 1, comprising means (6) for adapting the spectrum of the input light beam (2') to minimize the Brillouin scattering within the optical guide means (3).

8. The system (1) according to claim 1, wherein the optical guide means (3) comprise at least one optical fiber (3).

9. The system (1) according to claim 8, wherein the optical guide means (3) comprise at least two optical fibers (3) having different characteristics.

10. The system (1) according to claim 1, wherein the input light beam (2') is injected into an optical guide means (24), said means (24) being associated with the means (4) for generating the pump light beam (4') via a set of optical guide means.

11. The system (1) according to claim 1, wherein the means (4) for generating the pump light beam (4') comprise an arrangement of amplifiers (30, 32, 35), band-pass optical filters (31, 33) and polarizers (34).

12. The system (1) according to claim 1, wherein the means (4) for generating the pump light beam (4') comprise a laser source.

13. The system (1) according to claim 1, wherein the means (4) for generating the pump light beam (4') comprise means (7, 25) for recovering a portion of the input light beam (2') and means (26) for polarizing said beam (2').

14. The system (1) according to claim 1, comprising means (11, 20; 11, 27) for discharging the pump light beam after passing through the optical guide means (3).

15. The system (1) according to claim 14, wherein the discharge means (11, 20; 11, 27) comprise a circulator (20).

16. The system (1) according to claim 14, wherein the discharge means (11, 20; 11, 27) comprise a multi-wavelength coupler (27).

17. The system (1) according to claim 1, comprising means (10, 21; 10, 28) for outputting the input light beam after passing through the optical guide means (3).

18. The system (1) according to claim 17, wherein the output means (10, 21; 10, 28) comprise a circulator (21).

19. The system (1) according to claim 17, wherein the output means (10, 21; 10, 28) comprise a multi-wavelength coupler (28).

* * * * *

UNITED STATES PATENT AND TRADEMARK OFFICE
CERTIFICATE OF CORRECTION

PATENT NO. : 8,885,249 B2  
APPLICATION NO. : 13/496130  
DATED : November 11, 2014  
INVENTOR(S) : Julien Fatome Page 1 of 1

It is certified that error appears in the above-identified patent and that said Letters Patent is hereby corrected as shown below:

Title Page, Item (73) Assignee: Centre National de la Recherche Scientifique-CNRS, Paris (FR)

should read:

(73) Assignees: Centre National de la Recherche Scientifique-CNRS, Paris (FR); Université de Bourgogne, Dijon, (FR)

Signed and Sealed this  
Ninth Day of August, 2016

Michelle K. Lee  
*Director of the United States Patent and Trademark Office*